United States Patent
Soncina et al.

(12) 
(10) Patent No.: US 6,393,944 B1
(45) Date of Patent: May 28, 2002

(54) INTERMEDIATE TOTAL POWER TAKEOFF FOR TRUCKS AND SELF-PROPELLED MACHINES FOR VARIOUS OPERATIONS

(75) Inventors: Giovanni Soncina, Volciano; Renato Soncina, Salo', both of (IT)

(73) Assignee: Omsi Trasmissioni S.p.A. (IT)

( * ) Notice: Subject to any disclaimer, the term of this patent is extended or adjusted under 35 U.S.C. 154(b) by 0 days.

(21) Appl. No.: 09/562,812

(22) Filed: May 1, 2000

(30) Foreign Application Priority Data

Apr. 5, 2000 (IT) .......................................... 2000A0036

(51) Int. Cl.[7] .............................................. F16H 37/06
(52) U.S. Cl. .................................. 74/665 GA; 74/15.88
(58) Field of Search ........................... 74/15.88, 665 GA

(56) References Cited

U.S. PATENT DOCUMENTS

| | | | | |
|---|---|---|---|---|
| 1,258,883 A | * | 3/1918 | Farmer ........................ | 74/15.88 |
| 2,807,962 A | * | 10/1957 | Howlett ...................... | 74/15.88 |
| 3,049,929 A | * | 8/1962 | Wagner .................. | 74/15.88 X |
| 3,241,628 A | * | 3/1966 | Thomas .................. | 74/15.88 X |
| 3,442,346 A | * | 5/1969 | Winter et al. .......... | 74/15.88 X |
| 4,722,235 A | * | 2/1988 | Kumazawa ............. | 74/15.88 X |
| 5,826,460 A | | 10/1998 | Soncina et al. | |

FOREIGN PATENT DOCUMENTS

| | | | | |
|---|---|---|---|---|
| DE | 1816069 | * | 6/1970 | ................ 74/15.88 |
| IT | 01277770 | | 7/1995 | |

\* cited by examiner

Primary Examiner—Charles A. Marmor
Assistant Examiner—Ha Ho
(74) Attorney, Agent, or Firm—McGlew and Tuttle, P.C.

(57) ABSTRACT

A total power takeoff is provided which is positioned between a transmission and a differential gear of a self-propelled vehicle and is operated by the transmission of the vehicle. The power takeoff has a body which has an inlet shaft coming from the transmission and a grooved part, an outlet shaft which is disconnected from the inlet shaft and connected to the differential gear, an engaging ring rotating and sliding on the grooved part and a central driving gear, which is mounted on the inlet shaft for controlling at least one driven gear, for operating a shaft of a user, the engaging ring being movable between a position of engaging and a position of disengaging with the outlet shaft. A clutch is provided with the driven gear controlling the shaft of a user by the clutch. The clutch is arranged inside the body and can be engaged and disengaged without stopping the inlet shaft after the outlet shaft has been disengaged. At least one intermediate gear is provided having a related intermediate shaft. The intermediate gear is arranged between the central driving gear and the at least one driven gear for operating the shaft of a user.

7 Claims, 6 Drawing Sheets

INTERMEDIATE TOTAL POWER TAKEOFF FOR TRUCKS AND SELF-PROPELLED MACHINES FOR VARIOUS OPERATIONS

FIELD OF THE INVENTION

The present invention pertains to total power takeoffs for trucks and self-propelled machines for various operations, and more specifically, it pertains to power takeoffs that are inserted between the transmission and differential gear of such vehicles or machines and that are intended to control at least one user, such as pumps, suction pumps, compressors, etc., operating the power of the motor of the vehicle or machine.

BACKGROUND OF THE INVENTION

A total power takeoff that can be positioned between the transmission and differential gear of a self-propelled vehicle and operated by the transmission of the vehicle is known from a previous Italian Patent No. 1,277,770 of the same applicant. The total power takeoff comprises a body, which has an inlet shaft coming from the transmission and which has a grooved part, an outlet shaft disconnected from the inlet shaft and connected to the differential gear, an engaging ring rotating and sliding on the grooved part, a central driving gear mounted on the inlet shaft and intended to control at least one driven gear for operating a shaft of a corresponding user, such as pumps, suction pumps and the like, and in which the engaging ring is movable between a position of engaging with and a position of disengaging with the outlet shaft.

One distinctive feature of the power takeoff of such a device of the patent is that each driven gear controls the shaft of a related user by means of a clutch that is arranged inside the body and can be engaged and disengaged without stopping the inlet shaft after disengaging from the outlet shaft.

However, as soon as the driven gear that controls the shaft of a related user engages directly with the driving gear on the inlet shaft the user shaft rotates in the direction opposite that of the inlet shaft. However, for such users, it is preferable and advantageous for the shaft of each user to rotate in the same direction as the inlet shaft.

SUMMARY AND OBJECTS OF THE INVENTION

The primary object of the present invention is also to solve this problem, which is accomplished by inserting an intermediate gear with a related shaft between the central driving gear on the inlet shaft and the driven gear on the shaft of the user.

This arrangement also offers the advantage of being able to use the intermediate shaft for the operation of another corresponding user, since the intermediate shaft may be provided with a means for engaging/disengaging, as needed.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
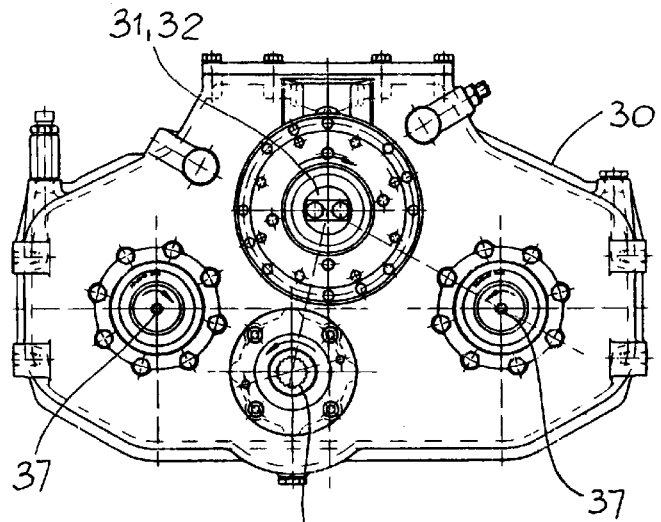
FIG. 1 is a front view of a power takeoff with parallel shafts spaced apart in a horizontal plane.

Referring to the drawings in particular, as is already described in the above-mentioned, previous patent, the power takeoff generally has a body 30 having an inlet shaft 31 which is connected to the transmission and by means of same to the motor of a vehicle, and an outlet shaft 32 which is connected to the differential gear of a self-propelled vehicle. The two shafts are in line but are not connected rigidly, but rather are engageable or disengageable by means of an engaging ring 34 that is slidingly coupled to a grooved shaft 31a.

Figure 4:
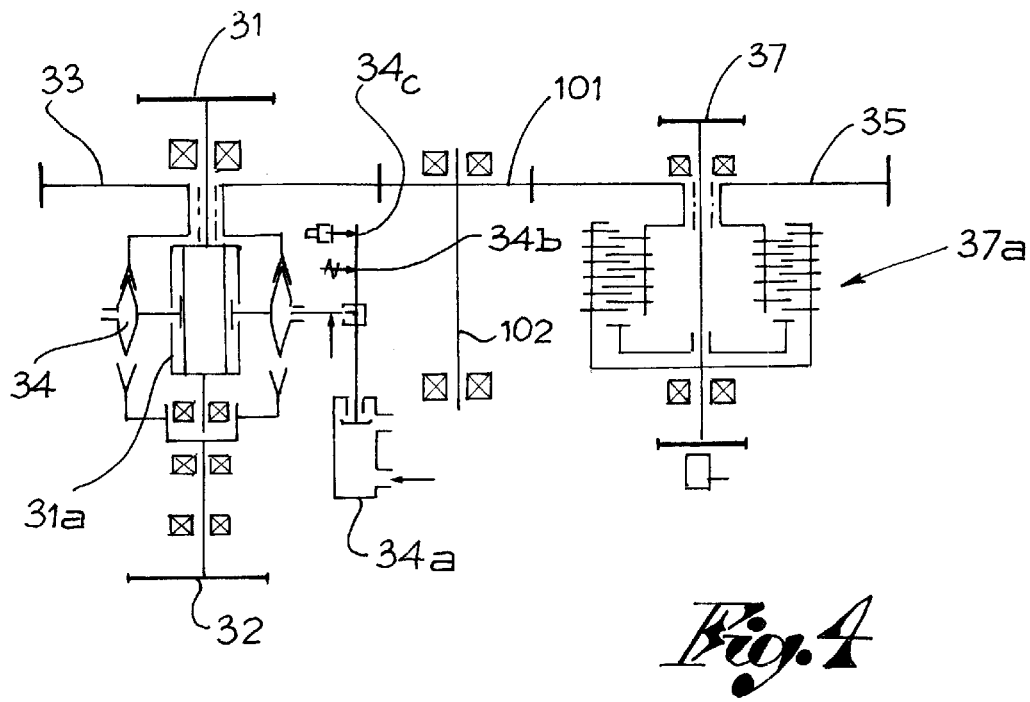
FIG. 4 is a schematic view of a power takeoff with only one user shaft and with a fixed and engageable/disengageable intermediate shaft.
Figure 5:
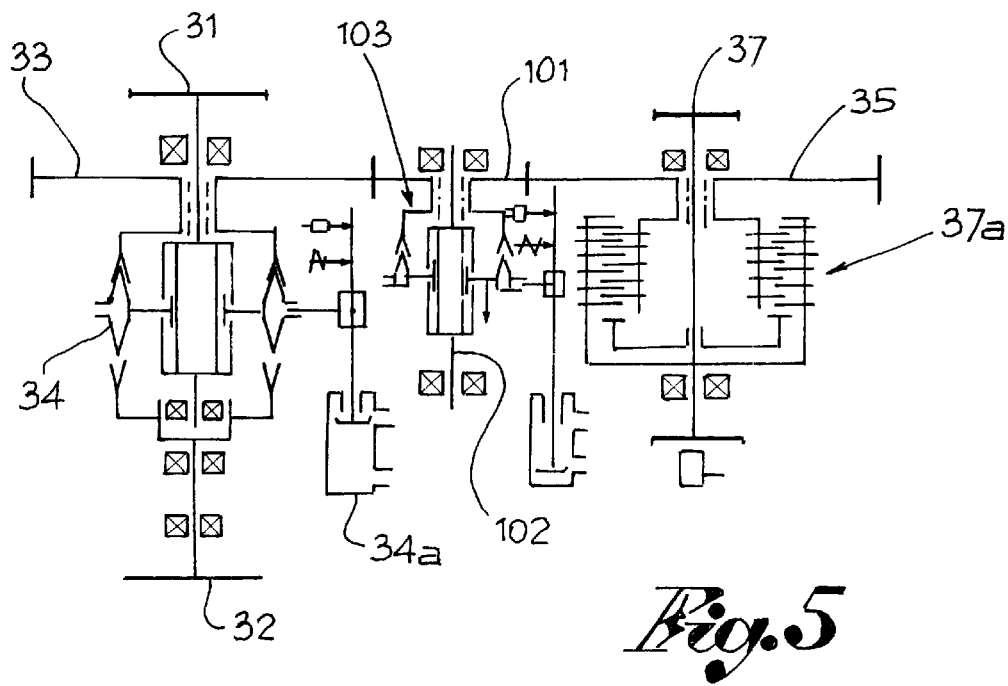
FIG. 5 is a schematic view of a power takeoff with only one user shaft and with a fixed and engageable/intermediate shaft.

On the inlet shaft there is mounted, idle, a central driving gear 33 which is intended to control one (FIGS. 4, 5) or two (FIGS. 6, 7) lateral driven gears 35, each for operating a respective shaft 37 of a user (not shown) in the form of a pump, suction pump, or other by means of a clutch 37a.

The engaging ring 34, which is controlled by a pneumatic cylinder 34a, can be moved on the grooved shaft 31a between a first position of engaging with the outlet shaft 32 and a second position of engaging with the central gear 33, and vice versa. To the rod of the cylinder 34a are coupled a mechanical safety lock 34b and an electric indicator 34c, which signals when the engaging ring 34 is connected to the central gear.

According to the present invention, an intermediate gear 101 that has a related intermediate shaft 102 and may or may not be provided with attachments for a possible additional user, is placed between the driving gear 33 and the or at least one driven gear 35. Thus, the gear 101 enables the user shaft 37 to rotate in a direction that is in agreement with the inlet shaft 31.

In another embodiment of power takeoff (FIG. 5), the intermediate shaft 102 is not rigidly connected to the corresponding intermediate sear 101, but rather the shaft 102 and gear 101 can be engaged or disengaged depending on whether or not additional users are needed. The gear 101 and the shaft 102 can be connected by means of an engaging/disengaging means 103, which is similar to the one used to engage/disengage the inlet shaft 31 and the outlet shaft 32.

Figure 6:
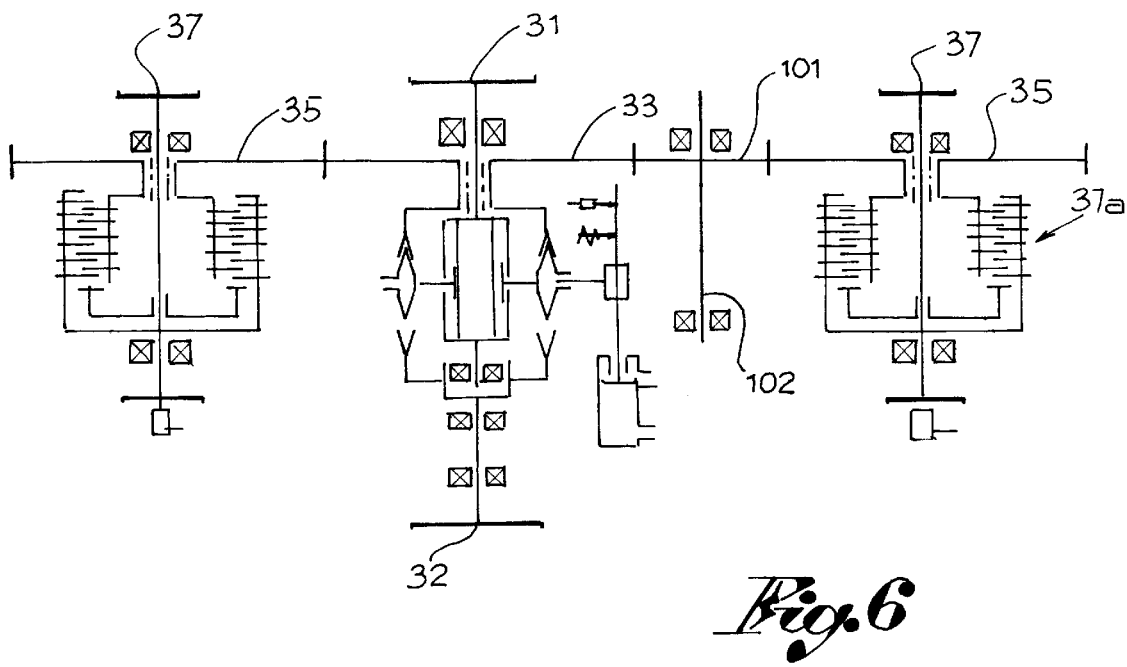
FIG. 6 is a schematic view of a power takeoff with two user shafts and with a fixed and engageable/disengageable intermediate shaft.
Figure 7:
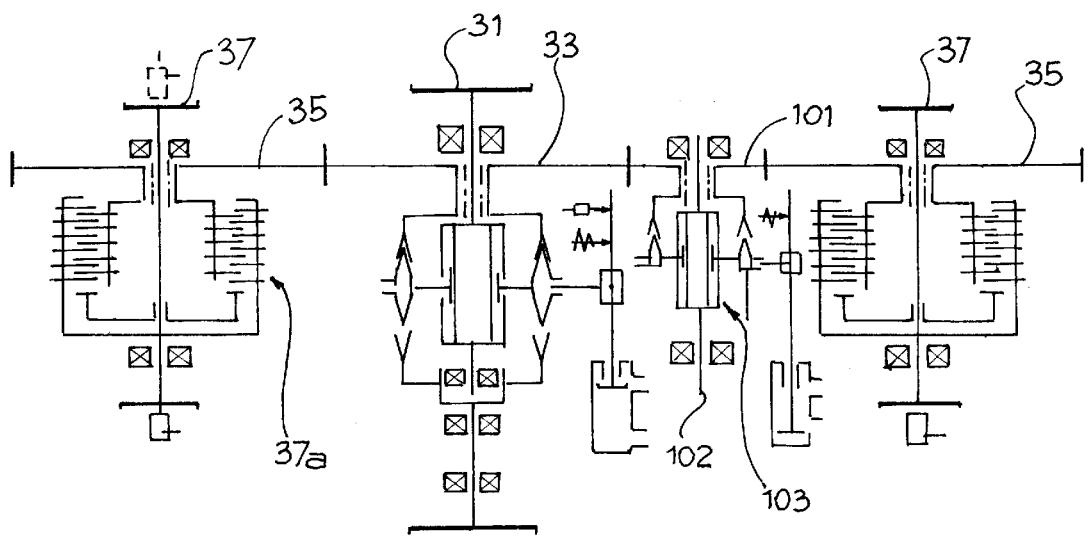
FIG. 7 is a schematic view of a power takeoff with two user shafts and with a fixed and engageable/disengageable intermediate shaft.

Both embodiments are also applicable in cases of two user shafts 37, as illustrated in FIGS. 6 and 7, on opposite sides of the inlet shaft.

Figure 12:
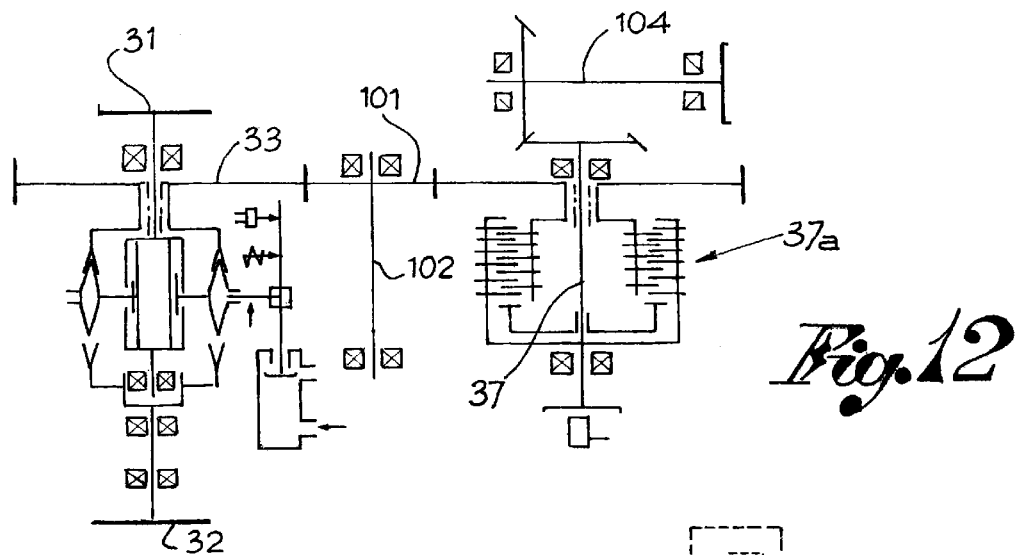
FIG. 12 is a schematic view of the power takeoff with one angular transmissions.
Figure 13:
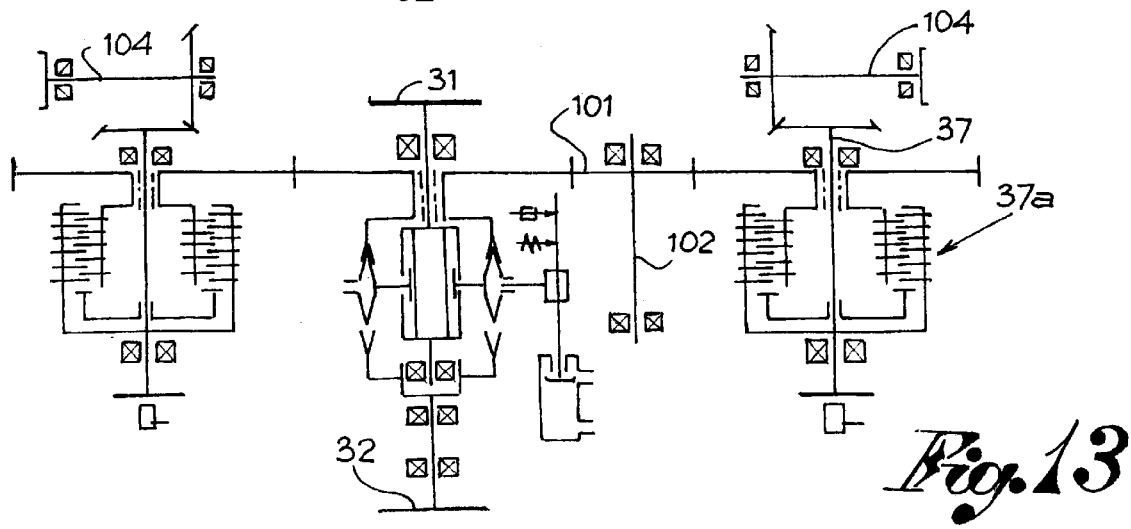
FIG. 13 is a schematic view of the power takeoff with two angular transmissions.

The power takeoff may also be provided with an angular transmission 104 on at least one user shaft 37, as shown in FIGS. 12 and 13, which represent a power takeoff in the configuration with one and two user shafts, respectively.

Figure 3:
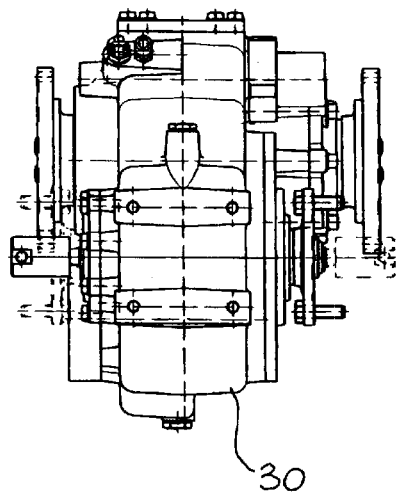
FIG. 3 is lateral view of a power takeoff with parallel shafts spaced apart in a horizontal plane.
Figure 2:
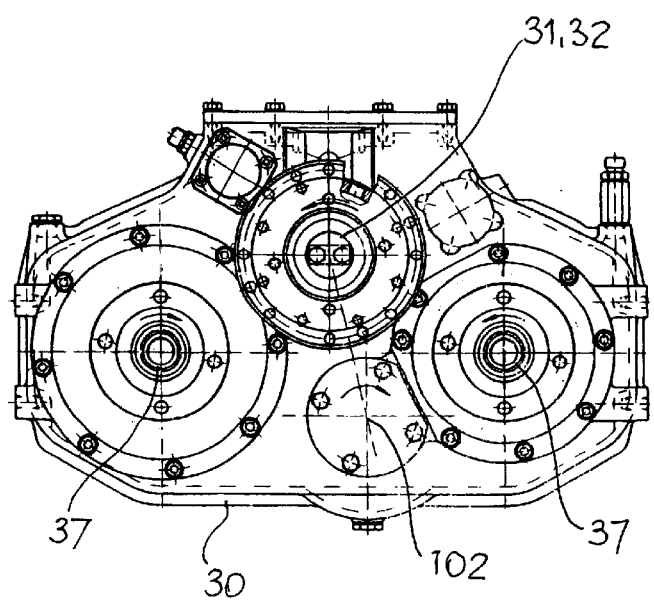
FIG. 2 is rear view of a power takeoff with parallel shafts spaced apart in a horizontal plane.
Figure 8:
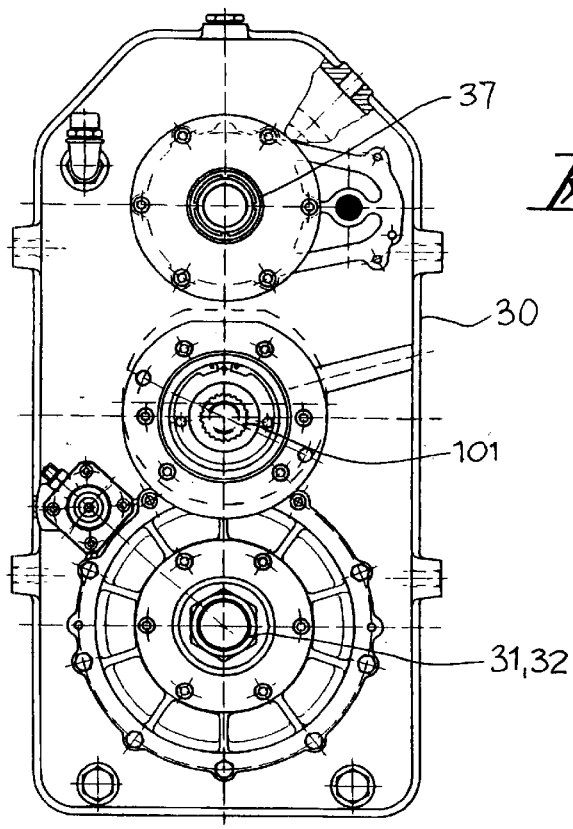
FIG. 8 is a front view of a power takeoff with parallel shafts spaced apart in a vertical plane.
Figure 10:
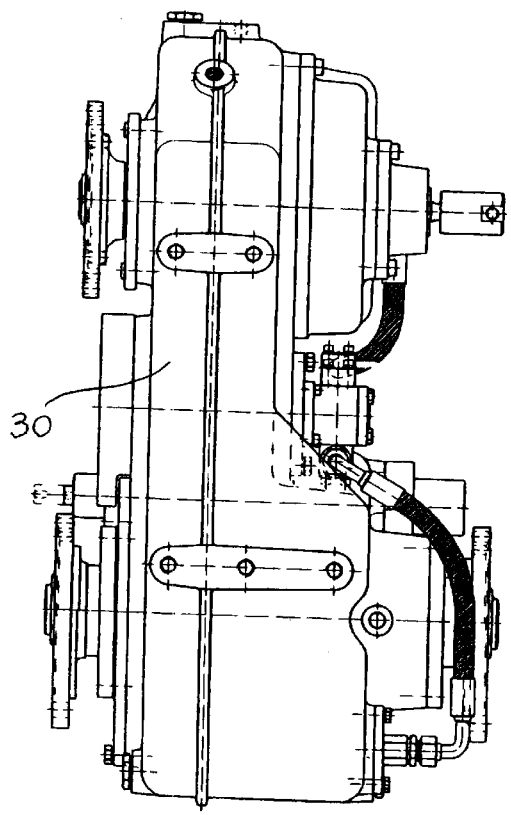
FIG. 10 is a lateral view of a power takeoff with parallel shafts spaced apart in a vertical plane.
Figure 9:
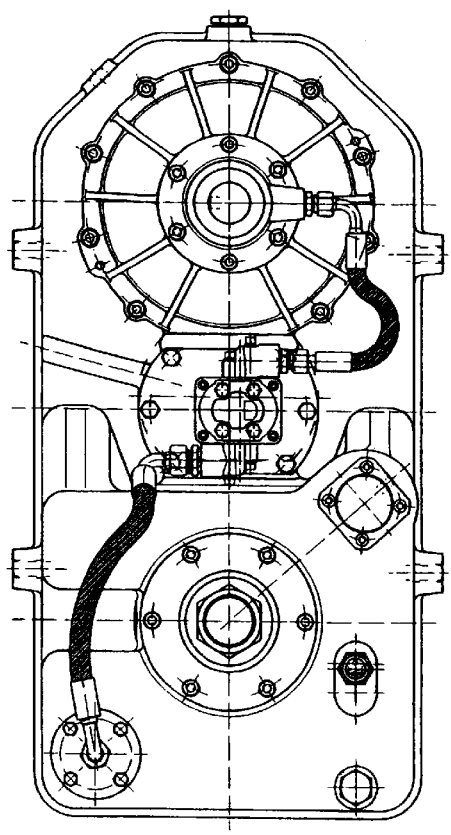
FIG. 9 is of a power takeoff with parallel shafts spaced apart in a vertical plane.

In all the cases described above, the power takeoffs may be produced either with shafts that are parallel to one another and spaced apart in a horizontal plane, as illustrated in FIGS. 1, 2 and 3, or with shafts that are parallel to one another and spaced apart in a vertical plane, as is illustrated in FIGS. 8, 9 and 10.

Figure 11:
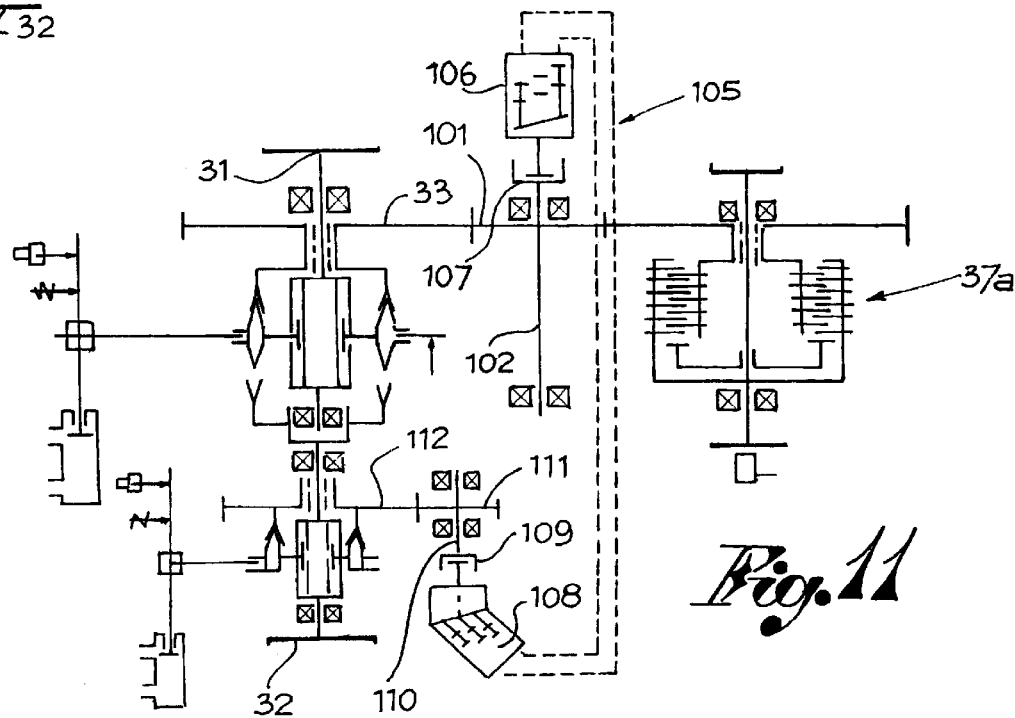
FIG. 11 schematic view of the power takeoff with mixed mechanical-hydrostatic transmission.
Figure 11B:
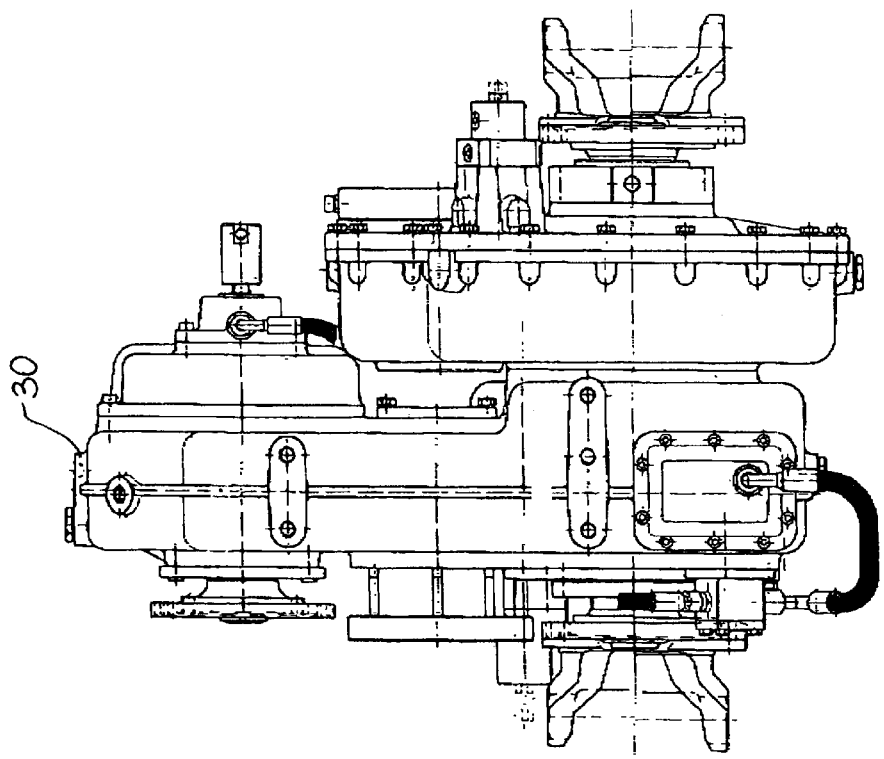
FIG. 11b is another external view of the power takeoff, which also incorporates the hydrostatic transmission.
Figure 11A:
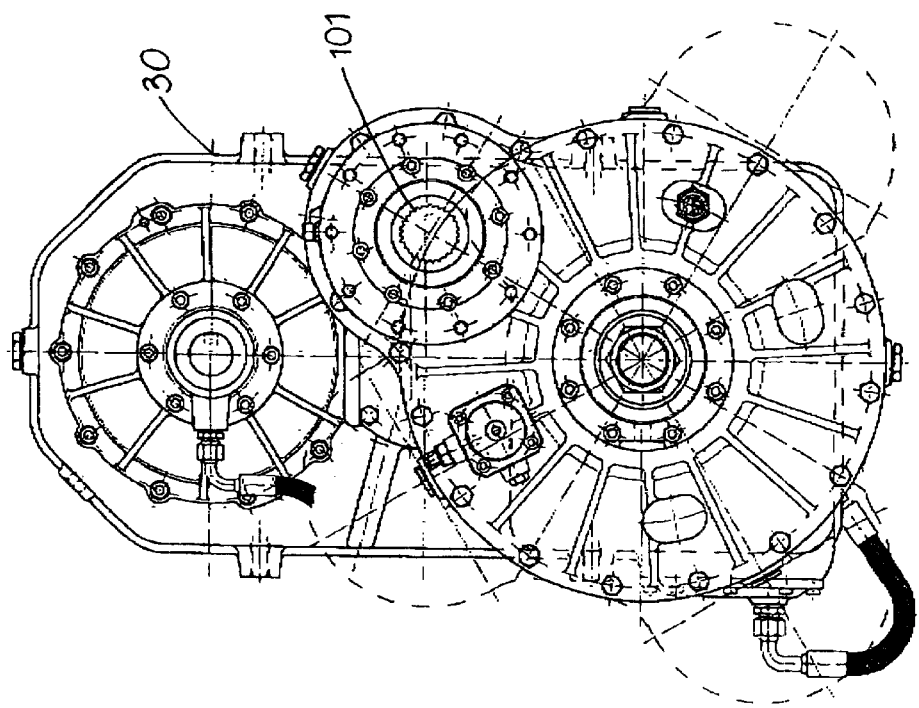
FIG. 11a is external view of the power takeoff, which also incorporates the hydrostatic transmission.

In another embodiment (FIGS. 11, 11a and 11b), the intermediate shaft 102 is used to form a mixed mechanical-hydrostatic transmission. In this case, the intermediate shaft 102 and the outlet shaft 32 may be connected by means of a hydraulic circuit 105 using a pump 106. On the one hand, the pump 106 is coupled to the intermediate shaft 102 by means of a rigid coupling 107, and, on the other hand, a hydraulic motor 108 with a rigid coupling 109 is coupled to the transmission shaft 110 on which is fixed the gear 111, which transmits the rotation to the gear 112. This gear 111 may be engaged and disengaged with the outlet shaft 32 by means of an engaging/disengaging block, of the type, for example, described previously for engaging/disengaging the inlet shaft and the outlet shaft.

In the case of a purely mechanical transmission, the inlet shaft 31 is connected, by means of the engaging ring 34, to the outlet shaft 32 for the normal running of the vehicle. In order to move to a hydrostatic transmission, it is necessary to connect the inlet shaft 31 to the driving gear 33, and as a result, to the intermediate shaft 102 by means of moving the engaging ring 34 in the direction of the arrow in FIG. 11, thus by engaging the outlet shaft 32 with the gear 112. At this point, the outlet shaft is released by the inlet shaft 31 and is coupled to the intermediate shaft 102. Therefore, the speed of rotation of the outlet shaft 32 is controlled by the pump 106 and by the motor 108.

Finally, it should be noted that, as in the previous patent mentioned above, in each variation described, the central driving gear 33 of the power takeoff may be connected directly and still rotate with the inlet shaft 31 coming from the transmission, without thereby going beyond the scope of the present invention defined by the following the claims.

While specific embodiments of the invention have been shown and described in detail to illustrate the application of the principles of the invention, it will be understood that the invention may be embodied otherwise without departing from such principles.

What is claimed is:

1. A total power takeoff which can be positioned between the transmission and the differential gear of a self-propelled vehicle and operated by the transmission of the vehicle, the total power takeoff comprising:

a body which has an inlet shaft coming from the transmission and a grooved part, an outlet shaft which is disconnected from the inlet shaft and connected to the differential gear, an engaging ring rotating and sliding on the grooved part, and a central driving gear, which is mounted on the inlet shaft for controlling at least one driven gear, for operating a shaft of a user, said engaging ring being movable between a position of engaging and a position of disengaging with said outlet shaft;

a clutch, said driven gear controlling said user shaft by said clutch, said clutch being arranged inside said body and can be engaged and disengaged without stopping said inlet shaft after said outlet shaft has been disengaged;

at least one intermediate gear having a related intermediate shaft, said intermediate gear being arranged between said central driving gear and said at least one driven gear for operating said user shaft; wherein said intermediate shaft is an integral part of said intermediate gear.

2. The total power takeoff in accordance with claim 1, further comprising a hydraulic circuit between said intermediate shaft and said outlet shaft for a hydrostatic mode of transfer of the vehicle with operating or nonoperating users.

3. The total power takeoff in accordance with claim 1, further comprising at least one angular transmission coupled to the user shaft.

4. The total power takeoff in accordance with claim 1, wherein said inlet shaft, said outlet shaft, said intermediate shaft and the user shaft are arranged in parallel to one another and spaced apart in horizontal plane.

5. The total power takeoff in accordance with claim 1, wherein said inlet shaft, said outlet shaft, said intermediate shaft and the user shaft are arranged in parallel to one another and spaced apart in a vertical plane.

6. A power takeoff positioned between a transmission and a differential gear of a vehicle and operated by the transmission of the vehicle, the power takeoff comprising:

a body;

an inlet shaft supported by said body, said inlet shaft coming from the transmission and having a grooved part;

an outlet shaft supported by said body, said outlet shaft being disconnected from the inlet shaft and being connected to the differential gear;

an engaging ring rotating and sliding on the grooved part;

a central driving gear mounted on the inlet shaft for controlling at least one driven gear, for operating a shaft of a user, said engaging ring being movable between a position of engaging and a position of disengaging with said outlet shaft;

a clutch, said driven gear dontrolling said user shaft by said clutch, said clutch being arranged inside said body and can be engaged and disengaged without stopping said inlet shaft after said outlet shaft has been disengaged; and at least one intermediate gear having a related intermediate shaft, said intermediate gear being arranged between said central driving gear and said at least one driven gear for operating said user shaft, said intermediate shaft being an integral part of said intermediate gear.

7. A power takeoff positioned between a transmission and a differential gear of a vehicle, the power takeoff comprising:

an inlet shaft coming from the transmission and having a grooved part;

an outlet shaft disconnected from the inlet shaft and being connected to the differential gear;

an engaging ring rotating and sliding on the grooved part, said engaging ring being movable between a position of engaging a position of disengaging with said outlet shaft;

at least one driven gear, for operating a shaft of a user;

a central driving gear mounted on the inlet shaft controlling said at least one driven gear, for operating a shaft of a user;

a clutch, said driven gear controlling said user shaft by said clutch being engaged and disengaged without stopping said inlet shaft after said outlet shaft has been disengaged; and at least one intermediate gear having a related intermediate shaft, said intermediate gear being arranged between said central driving gear and said at least one driven gear for operating said user shaft, said intermediate shaft being an integral part of said intermediate gear.

* * * * *